(12) United States Patent
Hübner

(10) Patent No.: US 11,988,249 B2
(45) Date of Patent: May 21, 2024

(54) JOINT

(71) Applicant: PHYSIK INSTRUMENTE (PI) GMBH & CO. KG, Karlsruhe (DE)

(72) Inventor: Reinhard Hübner, Waldbronn (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 542 days.

(21) Appl. No.: 17/040,435

(22) PCT Filed: Mar. 20, 2019

(86) PCT No.: PCT/DE2019/100263
§ 371 (c)(1),
(2) Date: Sep. 22, 2020

(87) PCT Pub. No.: WO2019/179579
PCT Pub. Date: Sep. 26, 2019

(65) Prior Publication Data
US 2021/0018039 A1    Jan. 21, 2021

(30) Foreign Application Priority Data
Mar. 23, 2018    (DE) .......................... 102018107015.2

(51) Int. Cl.
*F16C 11/12*    (2006.01)
(52) U.S. Cl.
CPC .......... *F16C 11/12* (2013.01); *F16C 2240/30* (2013.01); *F16C 2300/02* (2013.01); *Y10T 403/45* (2015.01); *Y10T 403/54* (2015.01)

(58) Field of Classification Search
CPC ...... F16C 11/12; Y10T 403/45; Y10T 403/54; Y10T 403/32041
See application file for complete search history.

(56) References Cited

U.S. PATENT DOCUMENTS

| | | | | |
|---|---|---|---|---|
| 2,793,028 A | * | 5/1957 | Wheeler ................... | F16F 1/02 74/519 |
| 3,140,614 A | * | 7/1964 | Willis .................... | G01L 9/0026 74/108 |
| 5,150,827 A | * | 9/1992 | Fries ..................... | B23K 3/0471 228/180.1 |
| 5,315,890 A | * | 5/1994 | Long ....................... | B23Q 1/36 74/110 |
| 6,283,666 B1 | * | 9/2001 | Genequand ............. | F16C 11/12 439/492 |
| 8,708,593 B2 | * | 4/2014 | Stratton .................. | F16C 11/12 403/220 |
| 9,371,855 B2 | * | 6/2016 | Voellmer ................ | F16C 32/02 |
| 10,711,832 B2 | * | 7/2020 | Bullard ................... | F16C 11/12 |

* cited by examiner

*Primary Examiner* — Michael P Ferguson
(74) *Attorney, Agent, or Firm* — The Juhasz Law Firm

(57) ABSTRACT

The invention relates to a joint, in particular for use in a parallel kinematic positioning device, which has at least three rotational degrees of freedom, and which has a rigid carrier element and at least two elastically deformable joint devices arranged overlapping one another at least in sections on the carrier element, wherein each of the joint devices comprises two joint elements, and each of the joint elements has an elongated connecting section and a securing section arranged at one end of the connecting section for securing the joint device to a higher level unit, and the two connecting sections of each joint device extend in a direction pointing away from the carrier element in such a way that they cross over one another.

15 Claims, 1 Drawing Sheet

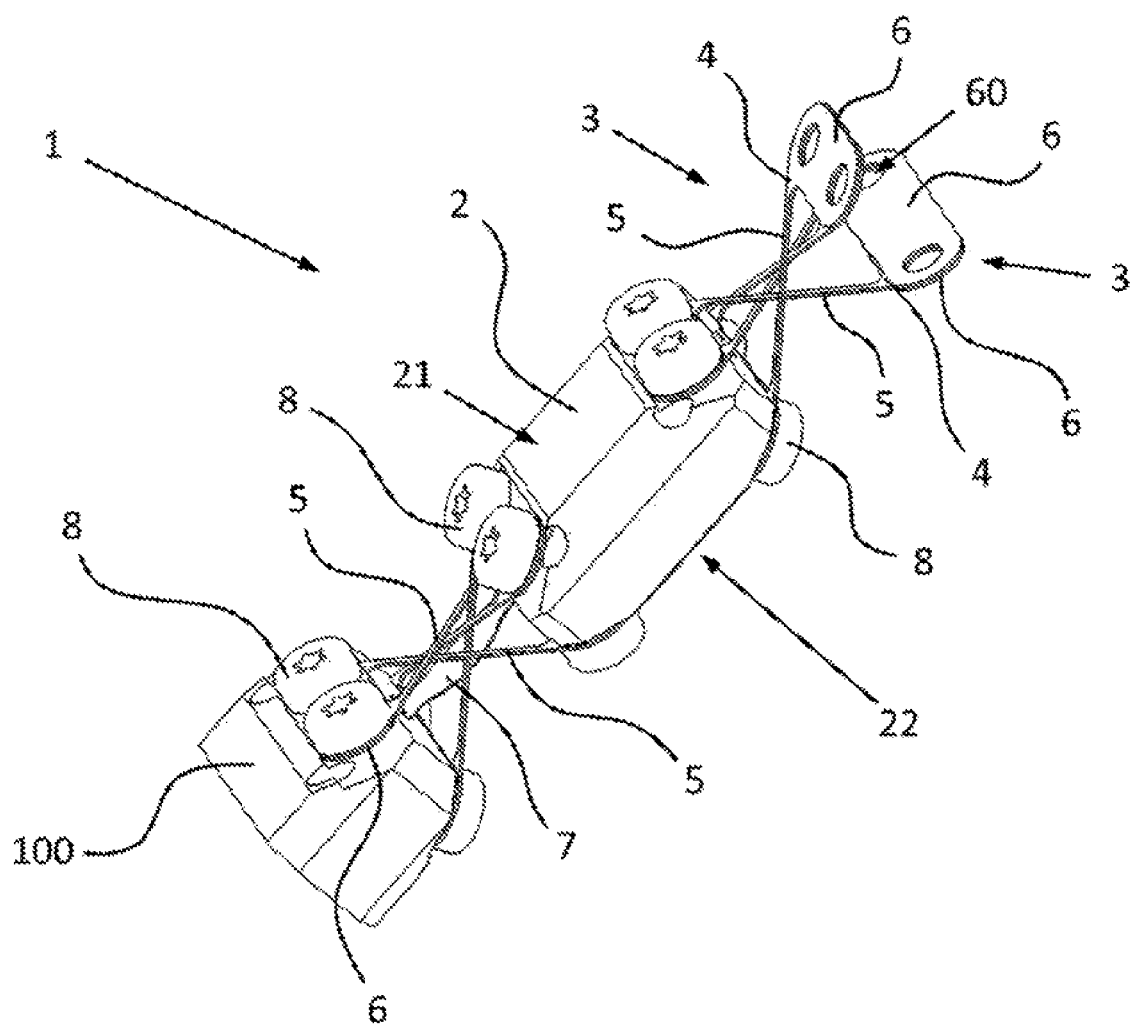

JOINT

The invention relates to a joint and a positioning device with such a joint.

From DE 10 2017 115 050 B3 a solid body joint is known, which has at least three degrees of freedom of rotation and which attempts to simulate the bearing behavior of a ball joint, without, however, having its disadvantages with regard to the unavoidable breakaway torques. Although the solution disclosed therein with suitable solid joints is already close to the bearing properties of a ball joint, however, there are certain disadvantages due to different stiffnesses in the individual degrees of freedom of rotation, so that this solution is less suitable for certain applications.

It is therefore an object of the invention to provide a joint with at least three degrees of freedom of rotation, i.e. with the functionality of a ball joint, which comprises stiffnesses which with respect to the degrees of freedom of rotation are the same or approximately the same.

This object is achieved by a joint which comprises a rigid carrier element (2) and at least two elastically deformable joint devices (3), which are arranged at the carrier element (2) in an overlap at least in a section, wherein each of the joint devices (3) comprises two joint elements (4), and wherein each of the joint elements (4) comprises an elongated web section (5) and a fastening section (6) which is arranged at one end of the web section (4) for fastening the joint device (3) at a higher-level unit, and wherein the two web sections (4) of each joint device (3) extend in a direction which points away from the carrier element (2) in such a way that the same cross one another.

FIG. 1 depicts an illustrative embodiment of my invention disclosed herein.

The term "essentially" which is used in the following part of the description in several places in connection with the specification of geometric data such as angles, dimensions, positions, orientations or directions, is to be understood as meaning that the corresponding geometric data may have a deviation of +/−5% compared to the respective specified geometric data, wherein this deviation is due, for example, to manufacturing or assembly tolerances.

The joint according to the invention, which comprises at least three degrees of freedom of rotation, comprises a rigid carrier element and at least two elastically deformable joint devices which are arranged at the carrier element in a covering or in an overlap of one another at least in a section.

Each of the two elastically deformable joint devices comprises two joint elements, wherein each of the joint elements comprise an elongated, preferably rod-shaped web section and a fastening section which is arranged at one end of the web section. This fastening section is provided in order to attach the joint to a higher-level unit or to an element of a higher-level unit in order to realize the desired mobility of the higher-level unit by means of the joint. The term "elongated web section" describes a web section whose longitudinal extension is significantly greater than its extension in the directions perpendicular to the longitudinal extension, i.e. its length is much greater than its width and thickness or height.

The two web sections of a joint device extend in a direction which points away from the carrier element in such a way that they cross one another in a mutually overlapping manner. The corresponding crossover area ensures a certain relative movement of the web sections with respect to one another in the crossover area, so that an advantageous mobility of the joint device results in case of a corresponding demands, in particular with regard to a rotational movement or tilting in a plane which extends parallel to the carrier element or in the plane of the support element.

In this connection it can be advantageous that the two web sections of a joint device at least in a section enclose an angle between them which amounts to between 60 degrees and 120 degrees, and preferably between 70 degrees and 95 degrees.

It can be advantageous that at least one web section and preferably both web sections of one joint device runs or run at least in a section between the two web sections of the other joint device. In other words, a web section or both web sections of one joint device pass through a frame or its opening formed by the two web sections of the other joint device. In this way, a crossing arrangement of the joint devices can be implemented comparatively easily.

It can also be advantageous that the web sections of a joint device are arranged to the web sections of the other joint device at an angle which amounts to between 60 degrees and 90 degrees. Such an arrangement results in a particularly effective function of the joint according to the invention.

In addition, it can be advantageous that the area of the crossing of the web sections of a joint device has a different distance from the support element than the area of the crossing of the web sections of the other joint device. In concrete terms, it can be advantageous for the area of the crossover of the web sections of one joint device to be arranged closer to the support element than the crossover area of the web sections of the other joint device.

Furthermore, it can be advantageous that one joint element comprises two fastening sections which are arranged at opposite ends of the web portion. The joint element can thus be fastened to the carrier element via one of the fastening sections, while the other fastening section of the same joint element is used for fastening to a superordinate unit or an element of a superordinate unit.

In addition, it can be advantageous that the joint elements are made in one piece, that is to say that the fastening section is realized or the fastening sections are realized in one piece or integrally with the web section. As a result, the parts of the joint element or of the entire joint are reduced so that the assembly of the joint is simplified and can be implemented more quickly or more cost-effectively.

In addition, it can be advantageous that all of the joint elements to have essentially the same geometry. This simplifies the production and manufacturing process.

It can also be advantageous that the two joint elements of a joint device are arranged in mirror image to one another. Thereby, in particular a symmetrical arrangement of the web sections of a joint device result in an equally symmetrical deformation behavior of the joint device, in particular in a largely identical flexibility around all degrees of freedom of rotation.

Furthermore, it can be advantageous that on the carrier element at least one elastically deformable support element is arranged. In this connection, it is particularly advantageous if the support element extends at least in a section between at least one of the two joint devices in a direction which points away from the support element. With the aid of the support element, a tensile force can be applied to the web sections of the joint elements in a simple manner, so that a pretensioning of the joint elements in the extension direction of the joint results.

Furthermore, it can be advantageous that the joint comprises four joint devices which are arranged at the support element and two support elements which are arranged at the support element, wherein the joint devices are located in pairs and the support elements are individually located at the opposite ends of the support element. Due to the corresponding symmetrical structure of the joint, a largely identical flexibility around all degrees of freedom of rotation is realized on both sides of the support element.

The invention also relates to a positioning device, in particular a parallel kinematic positioning device, with at least one of the previously described joint.

An exemplary embodiment of the invention is described below with reference to the single FIG. 1. The same shows an embodiment of a joint 1 according to the invention, which comprises a total of four joint devices 3 which are disposed at an essentially rigid carrier element 2 which consist of aluminum, wherein the joint devices 3 are elastically deformable or flexible and are made of spring steel. Other materials which comprise a corresponding elastic deformability or flexibility for use for the joint devices 3 are also conceivable, for example bronze, which is non-magnetic and can be used in case that the joint according to the invention is used in a magnetic field. In case that only very small deflections of the joint are intended, the joint devices can also be made of a ceramic material.

The carrier element 2, which besides aluminum can also be made of another metal, for example of steel, or also of ceramic, has an essentially rectangular shape, wherein the middle area comprises a greater thickness, and the carrier element extends towards its two ends tapered in terms of its thickness.

Each joint device 3 comprises two identically shaped joint elements 4, wherein each joint element 4 having an elongated, essentially rod-shaped web section 5 and two fastening sections 6 formed in one piece with this, which are arranged at the two opposite ends of the web section 5. However, a one-piece design of the fastening sections 6 with the elongated web section 5 or a one-piece design of the joint elements 4 is not mandatory so that the fastening sections 6 can also be connected to the web section 5 or arranged on it in another way.

The fastening sections 6 of a joint element 4 have the same shape, wherein only the fastening sections 6 which are spaced apart by the carrier element 2 are clearly visible in FIG. 1. Each of the two fastening sections 6 of a joint element 4 extends at the respective end of the web section 5 in a substantially flag-shaped manner to this, however the directions of extension of the fastening sections 6 at the opposite ends of the web section 5 are contrary to each other. Therefore, each joint element 4 has a substantially Z-shape. Each fastening section 6 also comprises two through bores or recesses 60.

The two joint elements 4 of a joint device 3 have the same shape, but are arranged in mirror-image to one another, the respectively associated fastening sections 6 coming to overlap in such a way that the two through bores 60 of one fastening section 6 are arranged exactly over the through bores 60 of the adjoining and associated fastening section 6. This makes it possible that a fastening element 8 in the form of a screw extends through the holes which are formed by the superimposed through holes and that a connection of the fastening section 6 to the carrier element 2 on the one hand and to an element 100 of a higher-level unit, on which or in which the joint according to the invention is installed or inserted, on the other hand, can be realized.

Due to the overlapping arrangement of the through bores 60 of two adjacent and associated fastening sections 6, by the fastening element 8, in addition to the connection with the carrier element 2 or the element 100 of a higher-level unit, a connection of the two joint elements 4 of a joint device 3 can be established. However, such a connection between the two joint elements 4 of a joint device 3 is not mandatory, so that the fastening sections 6 can also be designed in such a way that only the necessary fixation of the web section 5 between them is realized via them.

It is conceivable to realize the connection between the web sections 5 of a joint device 3 and the carrier element 2 not via screws, but via other types of connection such as soldering, welding, riveting or gluing. A one-piece or integral realization of the web sections 5 with the carrier element 2 while at the same time eliminating the corresponding fastening section 6 is also conceivable. It is conceivable by analogy to realize the connection between the web sections 5 of a joint device 3 and a higher-level unit not by means of screws, but also using the previously listed types of connection such as soldering, welding, riveting or gluing. Even a one-piece embodiment of the web sections 5 with the superordinate structure or unit is conceivable.

According to FIG. 1, in each case on both the upper side 21 of the carrier element 2 and the underside 22 of the carrier element there are two joint elements 4 fastened via their corresponding fastening section 6 and with the use of a screw 8. At the joint elements 4 of the corresponding joint device 3 which are attached to the upper side 21 of the carrier element 2, the web sections 5 are arranged in such a way that they extend in a direction pointing away from the carrier element 2 and cross one another in the further course. That is, the web sections 5 extend from the carrier element 2 in a direction that deviates from the direction of extension of the carrier element or is inclined with respect to the same, wherein the angle of this direction with regard to the corresponding side surface of the carrier element 2 amounts to less than 90 degrees. In addition, the web sections 5 of the two joint elements 4 which are arranged on the upper side 21 of the carrier element 2 in a direction pointing away from the carrier element 2 in such a way that they extend inclined with regard to the plane which is spanned by the upper side 21 of the carrier element 2. At the same time the two web sections 5 lie essentially in the same plane or emerge from the common plane only in the area of their crossing.

Also at the joint elements 4 of the corresponding joint device 3 which are mounted to the underside 22 of the carrier element 2, the web sections 5 are arranged such that the same extend in a direction which points away from the carrier element 2 and which cross each other in the further course. However, the area of the crossing of the two web sections 4 of the joint elements 4 which are fastened to the underside 22 of the carrier element 2 is positioned further away from the carrier element or at a distance from the same than the area of the crossing of the two web sections 4 of the joint elements 4 which are attached at the upper side 21 of the carrier element 2. As a result of the fact that the crossover areas are positioned at different distances from the carrier element 2, the two web sections of the joint elements 4 which are fastened to the upper side 21 of the carrier element 2 can extend in a section between the two web sections 5 of the joint elements which are fastened to the underside 22 of the carrier element 2 or can pass through the same. In other words, the two web sections 5 of the hinge device 3 which is arranged on the underside 22 of the carrier element 2, due to the crossover region which is positioned further away from the carrier element 2, form a substantially triangular frame through which the two web sections 5 of the hinge device 3 which is arranged on the upper side 21 of the carrier element 3 can pass through. This means that the joint elements 4 of a joint device 3 or their web sections 5 also comprise an arrangement with a crossing over of one another, i.e. next to the crossing arrangement of the two web sections 4 of a joint device 3.

Analogous to the web sections 5 of the joint device 3 which is arranged on the upper side 21 on the carrier element 2, the web sections 5 of the two joint elements 5 which are arranged on the underside 22 of the carrier element 2 extend in a direction which points away from the carrier element 2 in such a way that the same are arranged inclined with regard to the plane which is spanned by the underside 22 of the carrier element 2. At the same time the two web sections 5 lie essentially in the same plane or emerge from the common plane only in the area of their crossing.

The plane in which the two web sections 5 of the hinge device 3 which is arranged on the upper side 21 of the carrier element 2 does not extend parallel to the plane in which the two web sections 5 of the hinge device 3 which is arranged on the underside 22 of the carrier element 2 extend. The two planes described above enclose an angle which amounts to approximately 70 degrees.

At one of the two outward-facing ends or end portions of the carrier element 2 an elastically deformable, elongated and flat support element 7 is disposed, which, for reasons of clarity, has been omitted in FIG. 1 on the opposite side of the carrier element 2. The support element 7 is with one of its end portions inserted in a corresponding recess of the carrier element 2 used and fixed at this position by means of a clamp connection. Other types of attachment, such as a screw connection, gluing, soldering, welding or the like are also conceivable.

The support element 7 extends with its elongated shape in a direction which points away from the carrier element 2 and comprises, at its opposite end, a widening end section, which cannot be seen in FIG. 1, wherein the end section engages an element 100 of a superordinate unit or engages with a recess of an element 100, preferably via a clamp connection. By connecting the support element 7 to the element 100 of a superordinate unit, the support element 7 is acted upon by a compressive force, and this compressive force causes a tensile load on the joint elements 4 and, in particular, a corresponding pretensioning of their web sections 5 in a direction which essentially coincides with the direction of extension of the support element or the joint.

LIST OF REFERENCE SYMBOLS

1 joint
2 carrier element
21 upper side (of carrier element 2)
22 Underside (of carrier element 2)
3 joint device
4 joint element
5 web section
6 fastening section
7 support element
8 fastener
60 through bore
100 element (of a superordinate unit)

The invention claimed is:

1. A joint having at least three degrees of freedom of rotation, the joint comprising:
  a rigid carrier element and at least a first and a second elastically deformable joint device extending from different sides of the rigid carrier element;
  each of the first and the second elastically deformable joint devices comprises at least two joint elements;
  wherein the at least two joint elements of each of the first and the second elastically deformable joint devices each include a fastening section and a first elongated web section having a first terminal end and a second terminal end and a second elongated web section having a first terminal end and a second terminal end, the fastening section configured for fastening the joint to a higher-level unit;
  wherein the first terminal ends of the first and the second elongated web sections of the first and second joint elements of the first elastically deformable joint device is affixed to a first side of the rigid carrier and the first terminal ends of the first and the second elongated web sections of the first and second joint elements of the second elastically deformable joint device is affixed to a second side of the rigid carrier;
  wherein the first and second joint elements of each of the first and second elastically deformable joint devices crisscrosses each other within each of the joint devices;
  wherein the first elongated web section and the second elongated web section cross each other within each of the joint elements;
  wherein the first terminal ends of the first joint element of the first elastically deformable joint device is affixed to a first surface section of the first side of the rigid carrier and the first terminal ends of the second joint element of the first elastically deformable joint device is affixed to a second surface section of the first side of the rigid carrier; and
  wherein the first terminal ends of the first joint element of the second elastically deformable joint device is affixed to a first surface section of the second side of the rigid carrier and the first terminal ends of the second joint element of the second elastically deformable joint device is affixed to a second surface section of the second side of the rigid carrier.

2. The joint according to claim 1, wherein the web sections of the first and the second elastically deformable joint device are arranged at an angle to each other, wherein the angle amounts to between 60 degrees and 90 degrees.

3. The joint according to claim 1, wherein each joint element is made in one piece.

4. The joint according to claim 1, wherein each of the joint elements comprises essentially the same geometry.

5. The joint according to claim 4, wherein each of the joint elements of each of the first and the second elastically deformable joint devices are arranged in mirror image to one another.

6. The joint according to claim 1, further comprising at least one elastically deformable support element, the elastically deformable support element is attached at one end to the rigid carrier element and configurable to provide a tensile force to either of the first and the second elongated web section of the first and the second elastically deformable joint device, respectively.

7. The joint according to claim 6, wherein the crisscrossing of the web sections of the first elastically deformable joint device comprises a different distance from the support element than an area of the crisscrossing of the web sections of the second elastically deformable joint device.

8. The joint according to claim 6, wherein the elastically deformable support element lies at least in a section between the first and second joint elements of at least one of the first and a second elastically deformable joint devices in a direction extending away from the carrier element.

9. The joint according to claim 1,
wherein the two joint devices overlap each other, when viewed along a longitudinal axis which connects the first side of the rigid body and the second side of the rigid carrier body.

10. A joint according to claim 1 in a parallel kinematic positioning system.

11. The joint of claim 1, wherein the two joint devices overlap each other, when viewed along a longitudinal axis which is the middle axis of the arrangement of fastening sections of the first joint device and of fastening sections of the second joint device.

12. The joint of claim 1, wherein the first elongated web section and the second elongated web section is a single elongated web section and the fastening section lies along the single elongated web section.

13. The joint of claim 1, wherein the first elongated web section and the second elongated web section are connected to the fastening section.

14. The joint of claim 1, wherein first surface section of the first side of the rigid carrier and the second surface section of the first side of the rigid carrier are lying on sides of the rigid carrier that are opposed to each other.

15. The joint of claim 1, wherein first surface section of the second side of the rigid carrier and the second surface section of the second side of the rigid carrier are lying on sides of the rigid carrier that are opposed to each other.

\* \* \* \* \*